US012392172B2

(12) United States Patent
Sandoval

(10) Patent No.: US 12,392,172 B2
(45) Date of Patent: Aug. 19, 2025

(54) SPIDER WRAP WITH INTEGRATED CABLE LOCK

(71) Applicant: Industrial Security Solutions, Corp., Sparks, NV (US)

(72) Inventor: David Michael Sandoval, Reno, NV (US)

(73) Assignee: Industrial Security Solutions, Corp., Sparks, NV (US)

( * ) Notice: Subject to any disclaimer, the term of this patent is extended or adjusted under 35 U.S.C. 154(b) by 105 days.

(21) Appl. No.: 18/496,665

(22) Filed: Oct. 27, 2023

(65) Prior Publication Data

US 2025/0137297 A1 May 1, 2025

Related U.S. Application Data

(60) Provisional application No. 63/523,005, filed on Jun. 23, 2023.

(51) Int. Cl.
*E05B 73/00* (2006.01)
*E05B 67/00* (2006.01)

(52) U.S. Cl.
CPC ........ *E05B 73/0029* (2013.01); *E05B 67/006* (2013.01); *E05B 73/0011* (2013.01)

(58) Field of Classification Search
CPC .. E05B 67/003; E05B 67/006; E05B 73/0005; E05B 73/0011; E05B 73/0029
See application file for complete search history.

(56) References Cited

U.S. PATENT DOCUMENTS

| | | | | | |
|---|---|---|---|---|---|
| 2,933,915 | A * | 4/1960 | Ernest | E05B 67/006 | 70/49 |
| 5,440,904 | A * | 8/1995 | Su | E05B 67/003 | 70/49 |
| 5,706,679 | A * | 1/1998 | Zane | E05B 67/003 | 70/49 |
| 5,722,266 | A * | 3/1998 | Yeager | E05B 73/0029 | 70/49 |
| 6,192,720 | B1 * | 2/2001 | Kan | E05B 67/003 | 70/49 |
| 7,984,629 | B2 * | 7/2011 | Xiaobin | E05B 73/0029 | 70/57.1 |
| 8,683,959 | B2 * | 4/2014 | Friedland | E05B 37/025 | 119/793 |
| 10,821,939 | B2 * | 11/2020 | Saez | E05B 73/0005 | |
| 2004/0074265 | A1 * | 4/2004 | Bruening | E05B 69/00 | 70/57.1 |
| 2005/0223756 | A1 * | 10/2005 | Ling | E05B 73/0011 | 70/30 |
| 2009/0113946 | A1 * | 5/2009 | Baumgarten | E05B 67/006 | 70/18 |
| 2018/0112439 | A1 * | 4/2018 | Darakdjian | E05B 73/0005 | |
| 2023/0329469 | A1 * | 10/2023 | Alvarez Garcia | E05B 73/0011 | |

* cited by examiner

*Primary Examiner* — Christopher J Boswell
(74) *Attorney, Agent, or Firm* — Sheppard Mullin Richter & Hampton LLP

(57) ABSTRACT

An enhanced spider wrap security device is described. This device integrates a wrapping cable section, a top cap, and a bottom cap. The cable wraps around products, preventing removal. The integrated cable lock, located in the bottom cap, secures the spider wrap to fixtures or other spider wraps. The locking mechanism includes a magnetic component and requires a special tool, such as a key, for unlocking. The design allows flexibility in positioning the cable lock on either the top or bottom cap.

13 Claims, 10 Drawing Sheets

View from the top

View from the bottom

SPIDER WRAP WITH INTEGRATED CABLE LOCK

CROSS REFERENCE TO RELATED APPLICATION

This application claims the benefit of U.S. Provisional Patent Application No. 63/523,005, filed on Jun. 23, 2023. The entirety of the aforementioned application is incorporated herein by reference.

TECHNICAL FIELD

This disclosure relates generally to a security device to protect merchandise from theft and, in particular embodiments, to a spider wrap having an integrated cable lock.

BACKGROUND

Box wrap and spider wrap are two commonly used security devices in retail settings to safeguard merchandise from theft.

Box wrap, also referred to as box guards or box locks, is a security solution specifically designed to protect individual product boxes. It involves the use of a durable frame, typically made of plastic or metal, which wraps securely around the box. The frame may feature a locking mechanism or a seal to prevent unauthorized access. By encasing the product box, box wrap provides an additional layer of security, making it more difficult for potential thieves to access or remove the item without proper authorization. This visible deterrent helps to deter theft and protect valuable merchandise.

A spider wrap is another type of security device used to protect a variety of products, such as electronics, accessories, or high-value items. FIG. 1 shows a traditional spider wrap and how it is used to wrap an item. It is designed to secure merchandise by wrapping it tightly with a high-tensile cable or retractable wire. As shown, the spider wrap in FIG. 1 comprises two main components: the caps and the cable. The top cap and bottom cap serve as the endpoints of the device, providing structural support and housing the necessary alarm system. These caps are usually made of durable plastic or metal material to withstand handling and potential tampering. The high-tensile cable or retractable wire is the core component of the spider wrap. It is flexible yet strong, allowing it to be wrapped securely around the product or box being protected. The cable is threaded through specially designed channels or slots within the caps, ensuring a tight and reliable connection.

In stores today, products protected with box wrap or spider wrap may be fixed to fixtures to further enhance security. Without securely fixing the spider wrap-wrapped product to a fixture, there is a risk that individuals with malicious intent may steal the product along with the spider wrap itself. This vulnerability arises when the spider wrap is not properly attached or when it relies solely on the tension of the cable to prevent removal.

There are various methods for fixing the wrapped items to the fixture depending on the specific security device being used. For example, stores often run a locking cable through the spider wraps on multiple products to bundle them together, or using a single cable to lock the multiple products (e.g., running through respective spider wraps) altogether onto a fixture (e.g., a shelf) to prevent theft.

The existing solutions for securing products with box wrap or spider wrap using cables can be cumbersome and inconvenient for several reasons. One primary drawback is the need for store personnel to unlock the cable for multiple items (locked together) in order to access the target product. This process can be time-consuming and inefficient, especially when dealing with a large number of items. Additionally, managing and organizing the separate cables to run through each spider wrap-wrapped box can become cumbersome and lead to tangles or confusion. It requires careful attention to ensure that the cables are properly threaded through each box and securely attached to the fixture. This extra step in the purchasing process can be frustrating for both the customer and the store personnel, potentially leading to delays and suboptimal customer experiences. In addition, using a cable lock running through multiple spider wrap-wrapped boxes onto a fixture affects aesthetics. The presence of a long and thick cable can detract from the overall visual appeal of the product display, and may create a cluttered or messy appearance, diminishing the store's efforts to create an attractive and organized shopping environment.

SUMMARY OF INVENTION

According to various embodiments of the disclosed technology, this application describes a spider wrap having an integrated cable lock to provide a cleaner design for securing items in stores. By integrating an individual locking cable directly into the spider wrap, the inconvenience associated with running a separate cable through multiple wrapped items can be eliminated. This simplifies the process of securing the products to the fixture as well as fetching a target product, making it more efficient and user-friendly for store personnel.

DETAILED DESCRIPTION

Figure 1:
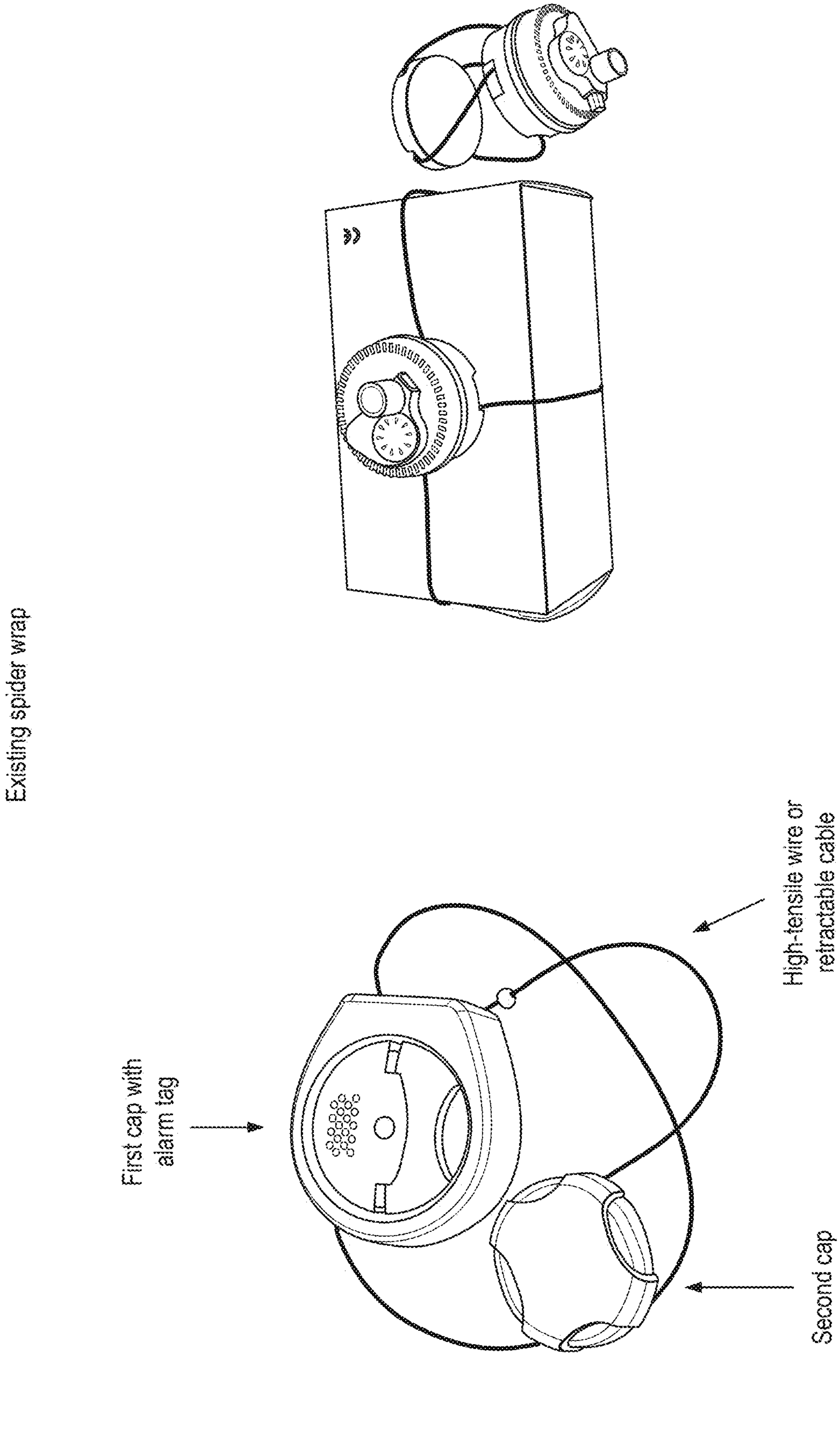
FIG. 1 illustrates a traditional spider wrap.
Figure 2:
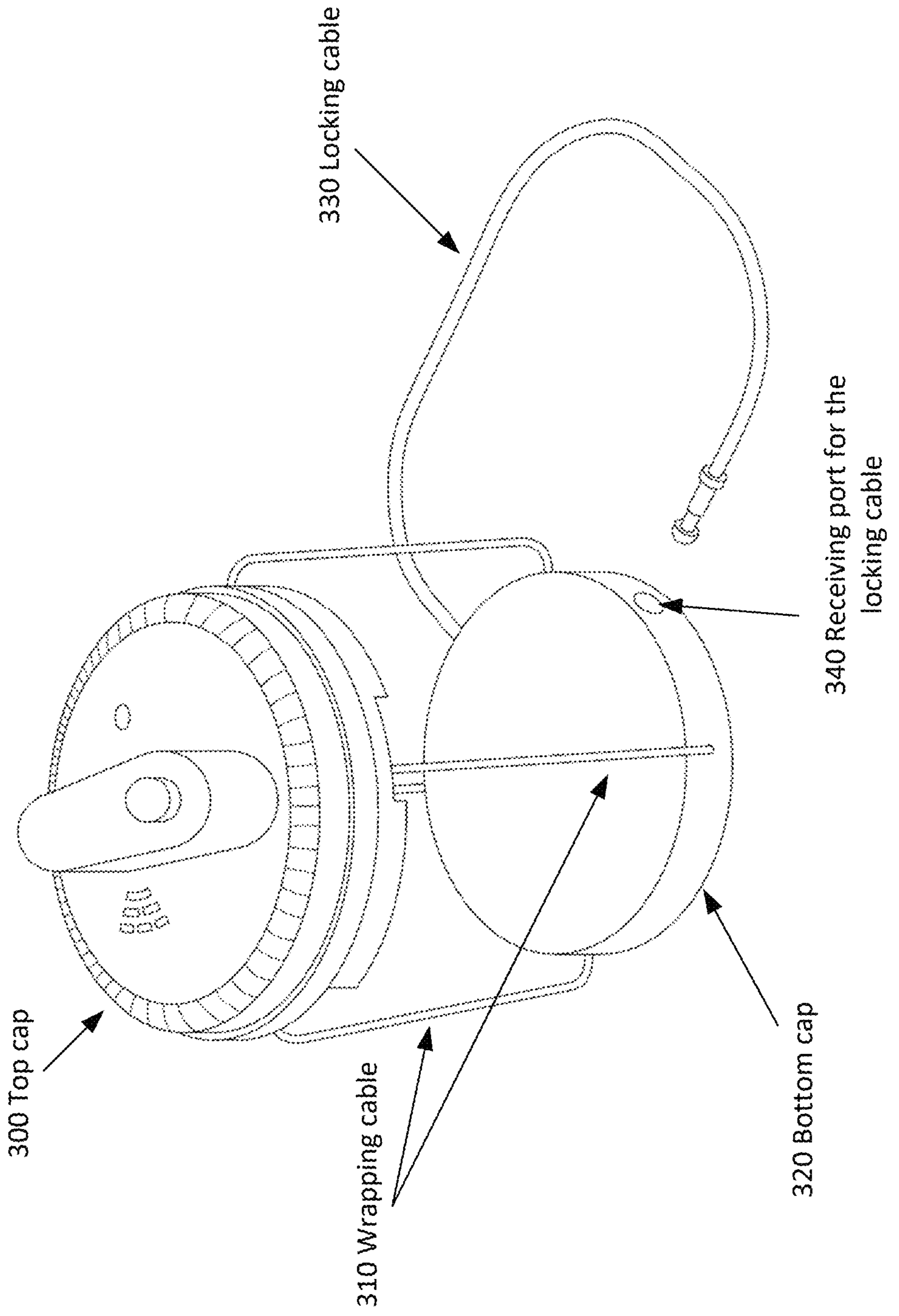
FIG. 2 illustrates a perspective view of an enhanced spider wrap including a spider wrap integrated with a cable lock, in accordance with some embodiments.

FIG. 2 illustrates a perspective view of an enhanced spider wrap including a spider wrap part integrated with a cable lock, in accordance with some embodiments.

As shown, the spider wrap part includes a wrapping cable section 310, a top cap 300, and a bottom cap 320. The wrapping cable section 310 may include high-tensile cable or retractable wire. This cable is designed to wrap around the products or boxes, preventing the item from being taken out of the wrapped box. The top cap 300 is located at one end of the spider wrap and serves as a connection point for the cable or wire. It may contain features such as an alarm tag or system that detects tampering or cutting of the cable (the wrapping cable 310 and/or the locking cable 330). The bottom cap 320 is located at the opposite end of the spider wrap and provides a secure termination point for the cable or wire.

The integrated cable lock is designed to lock the spider wrap part (and the item wrapped by the spider wrap) to a fixture or to another spider wrap. The cable lock may include a locking cable 330 and a receiving port 340 for the cable. In some embodiments, the cable lock is integrated into the bottom cap 320 of the spider wrap. For example, the locking cable 330 has two ends: the first end is securely fixed to a specific position on the bottom cap 320, while the second end can be easily attached (e.g., plugged in) to a designated receiving port 340 on the same bottom cap 320. When the second end of the cable 330 is plugged into the receiving port 340, the cable 330 becomes locked in place. In some embodiments, the cable 330 in a locked state may only be unlocked or released by a user, e.g., using a magnetic tool or key (not shown).

In some embodiments, the bottom cap 320 may include two receiving ports for both ends of the locking cable 330. In other words, both ends of the locking cable 330 may be removably plugged into respective ports and securely locked.

The bottom cap 320, the receiving port 340, and/or the cable 330 itself may be electronically connected with an alarm mechanism. The alarm can be triggered if the cable 330 is cut or otherwise tampered with, the second end is unauthorizedly unplugged, or if there is any sudden force that jerks the cable out of the receiving port 340. In one implementation, the cable 330 acts as a circuit, so breaking it from its connected state will trigger the alarm.

In some embodiments, the locking cable is designed with a discreet, clear coloration that blends seamlessly into its surroundings, ensuring minimal visibility. This design choice preserves the aesthetics of the shelf space while still providing the security and functionality of a locking cable.

Furthermore, when the second end of the cable 330 is unplugged, it can be threaded through a fixture and then plugged into the second position, effectively fixing the product that is wrapped by the spider wrap to the fixture. Alternatively, the second end of the cable 330 can be plugged into the receiving port 340 of a different spider wrap's bottom cap 320, allowing the connection of two items together. For instance, the cable 330 of the first spider wrap can plug into the receiving port 340 of the different (second) spider wrap, while the cable 330 of the second spider wrap can plug into the receiving port 340 of the first spider wrap. This method can be expanded to include more than two spider wraps if there is a need to bundle multiple products together for enhanced security and convenience.

The cable lock may use a magnetic locking mechanism to ensure that when the second end of the cable 330 is plugged into the receiving port 340 on the bottom cap 320, it becomes securely locked in place. This mechanism uses a magnet that provides the necessary locking force. The strength of the magnet can be adjustable to accommodate different security requirements. The adjustable magnet strength feature allows for flexibility in the level of security required for different situations. By adjusting the magnet strength, the locking mechanism can be made more or less resistant to disconnection attempts, providing a customizable solution to meet specific needs.

When the second end of the cable 330 is inserted into the receiving port 340, it engages with a magnetic component within the port. This magnetic component creates a strong magnetic field that holds the cable 330 firmly in position, preventing accidental disconnection or unauthorized removal of the cable 330.

To unlock the cable 330, a special tool, such as a key, is required. This tool is designed to interact with the magnetic locking mechanism in a specific way. When the tool is inserted and turned or otherwise tapped on the bottom cap 320, it effectively reduces or neutralizes the magnetic force, allowing the cable 330 to be safely unplugged from the receiving port 340.

While FIG. 2 illustrates that the cable lock is configured on the bottom cap, it is worth noting that a skilled individual in the field can readily modify this design to position the cable lock (including the locking cable 330 and the receiving port 340) on the top cap instead.

Figure 5A:
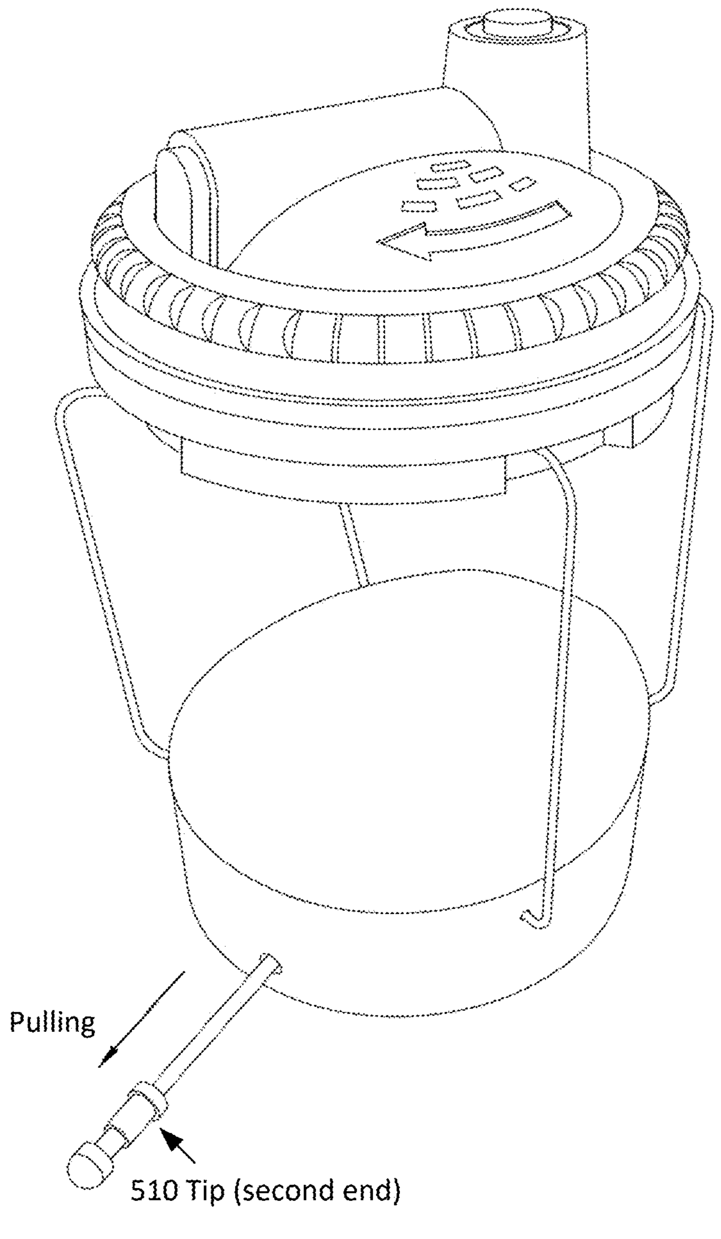
FIG. 5A and FIG. 5B illustrate a retractable cable lock integrated in the enhanced spider wrap, in accordance with some embodiments.
Figure 5B:
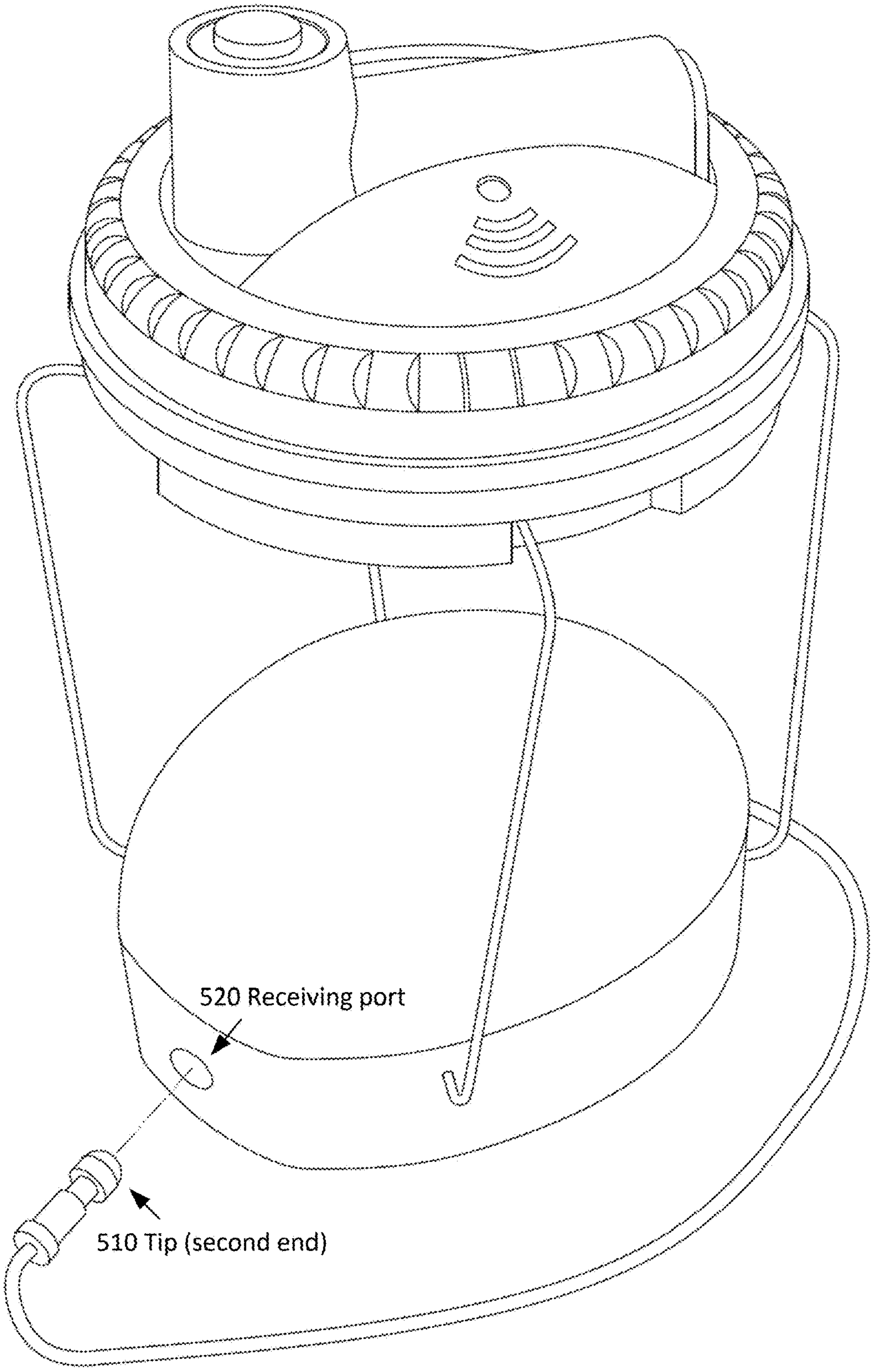
Figure 7:
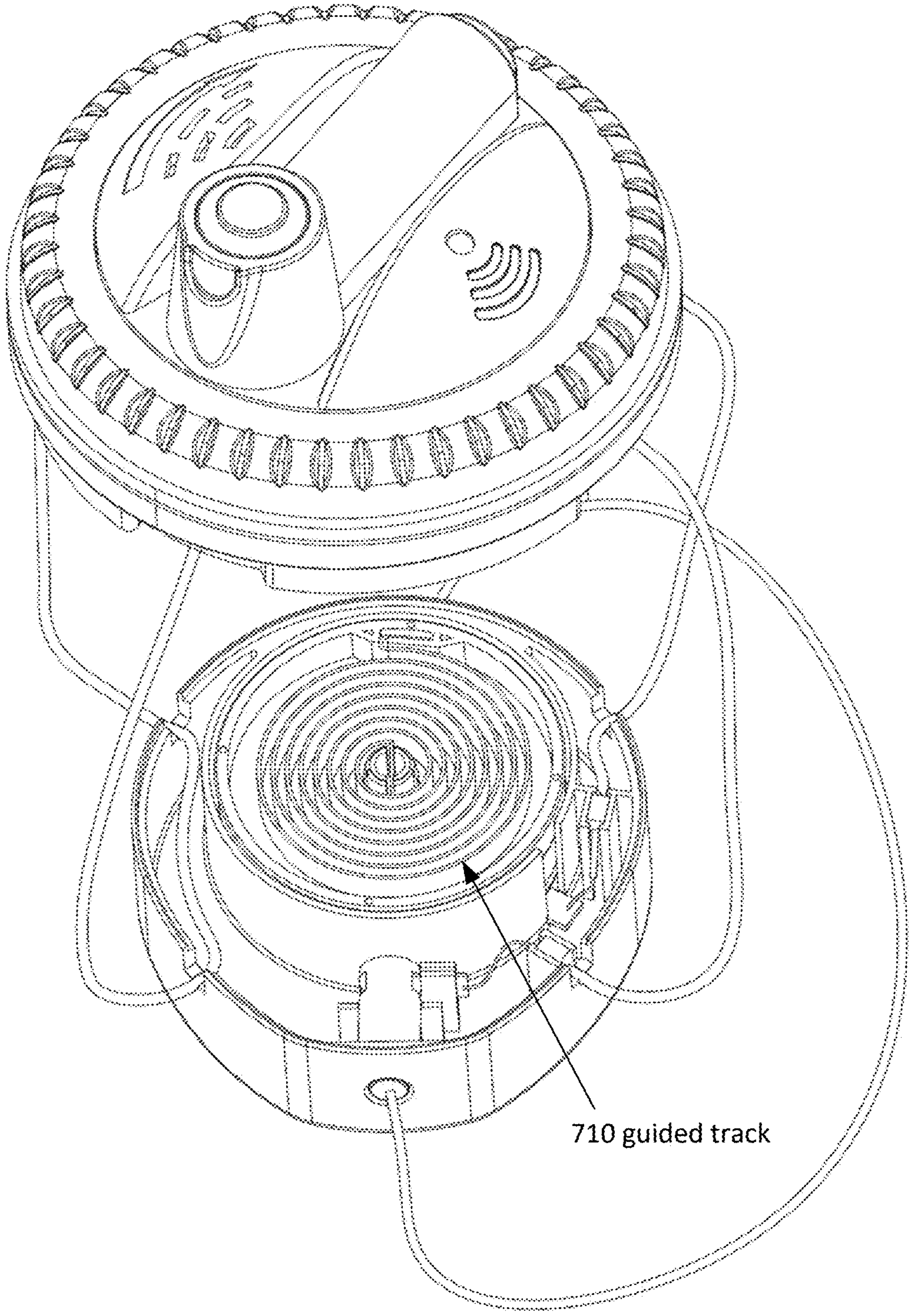
FIG. 7 illustrates a perspective view of the enhanced spider wrap exposing another exemplary internal structure of the bottom cap, in accordance with some embodiments.

In some embodiments, the first position on the bottom cap (for fixing the first end of the locking cable) and the second position on the bottom cap (i.e., the receiving port) may be spaced at an angle ranging from 45 to 180 degrees, inclusive of both 45 degrees and 180 degrees. In FIG. 2, these two positions are depicted as being 90 degrees apart. In FIGS. 5A, 5B, and 7, these two positions are depicted as being 180 degrees apart.

Figure 3A:
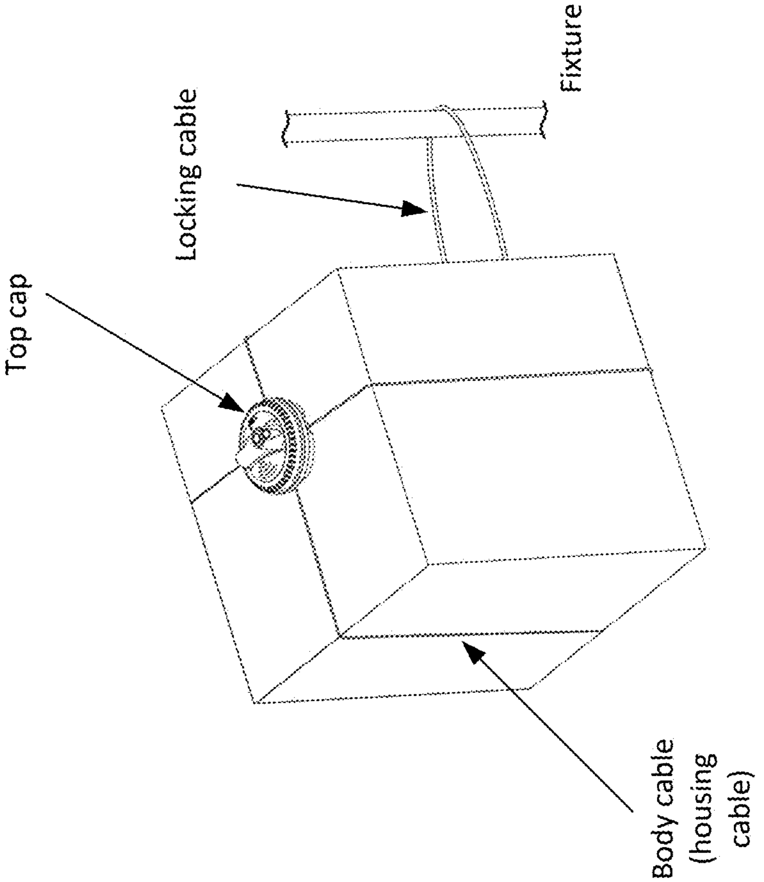
FIG. 3A and FIG. 3B illustrate different view perspectives of the enhanced spider wrap locking to a fixture by using the integrated cable lock, in accordance with some embodiments.
Figure 3B:
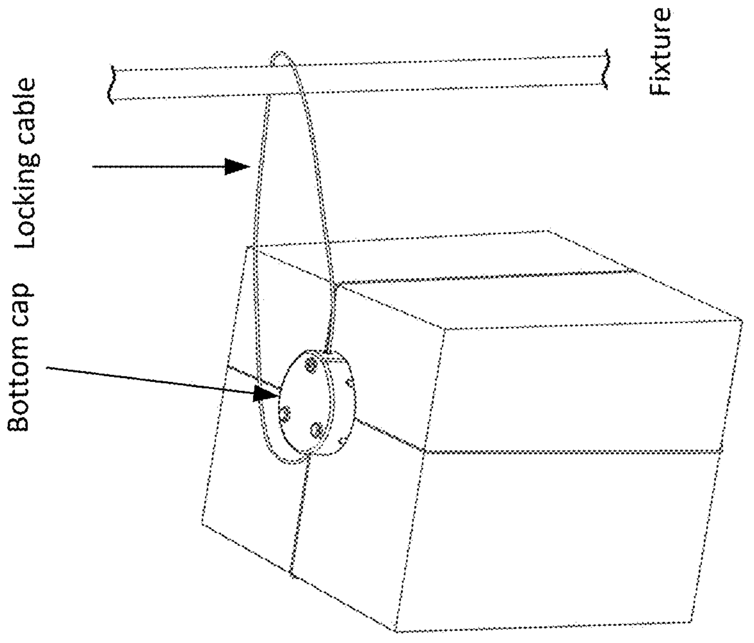

FIG. 3A and FIG. 3B illustrate different views of the enhanced spider wrap locking to a fixture by using the integrated cable lock, in accordance with some embodiments.

The top view FIG. 3A illustrates that the top cap of the spider wrap is located at the top of the box (representing a product or item, which may be in different shapes), and the wrapping cable (may also be referred to as housing cable) may secure the box such that the box and the item within the box cannot be taken out without unlocking the spider wrap. The locking cable integrated into the bottom cap of the spider wrap is used to lock the box to the fixture.

The bottom view FIG. 3B illustrates that the locking cable has both ends secured to the bottom cap of the spider wrap. The first end of the locking cable may be irremovably fixed to the bottom cap, and the second end of the locking cable may be removably plugged into the receiving port on the bottom cap, such that the box and the spider wrap are secured to the fixture.

FIGS. 3A and 3B depict securing the box with the spider wrap to a fixture, such as a display shelf in a store. Those skilled in the art would recognize that the spider wrap can also be used to secure the box to various other things in a similar manner. For example, once the locking cable of the spider wrap is unlocked, and the box is taken from the display shelf to the checkout area, customers or store associates can utilize the spider wrap to fasten the box to a shopping cart or basket, as well as other types of carriers. This may be achieved by threading the locking cable through the shopping cart or basket and plugging it into the bottom cap.

In some embodiments, the locking cable integrated into the bottom cap of the spider wrap is designed with an adjustable length to offer flexibility in securing the spider wrap to fixtures at various distances. For instance, the locking cable can initially be retracted into the bottom cap, leaving a small portion or the second end (such as a tip) of the cable exposed, as 510 depicted in FIGS. 5A and 5B.

Users can easily pull out this exposed portion from the bottom cap to the desired length.

Upon plugging the second end of the cable into the receiving port (as 520 depicted in FIG. 5B), the retracting system securely locks, preventing the cable from retracting. Some embodiments feature a switch as a part of the retracting system. When the switch is in the first state, the retracting system is activated, allowing the cable to retract. Switching it to the second state disables the retracting system, keeping the cable at its current length. Once the user has set the desired length, they can plug the second end of the cable back into the receiving port on the bottom cap. Once the receiving port receives the second end, the bottom cap securely locks the cable, preventing any further adjustment in length. This ensures that the cable remains fixed and taut, maintaining the desired level of security for the wrapped product.

In some embodiments, when the second end of the cable is unplugged from the receiving port, the retracting system is activated, allowing users to freely adjust the cable's length. By pulling the cable out of the bottom cap, additional length can be extended, enabling secure attachment to fixtures located farther away. Conversely, if a shorter length is desired, users can retract the excess cable back into the bottom cap at their convenience."

In other embodiments, the bottom cap may keep the retracting system of the locking cable unlocked (such that users can adjust the length of the locking cable) even after the second end of the cable is inserted into the receiving port. This may allow users to fetch the item from the shelf for a closer look but still keep the item locked to the fixture.

Figure 4:
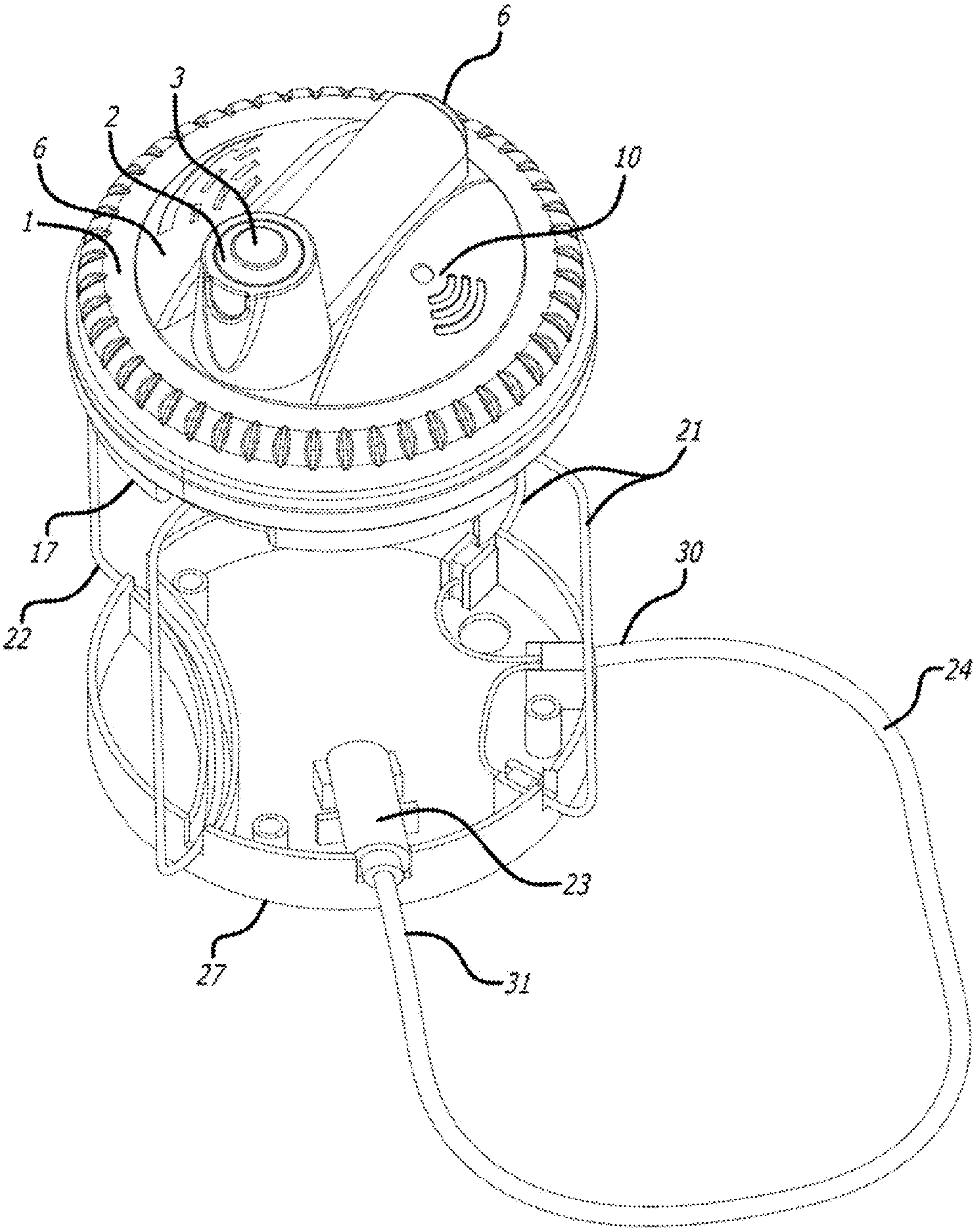
FIG. 4 illustrates a perspective view of the enhanced spider wrap exposing an exemplary internal structure of the bottom cap, in accordance with some embodiments.

FIG. 4 illustrates a perspective view of the enhanced spider wrap exposing an exemplary internal structure of the bottom cap, in accordance with some embodiments. As shown, the top cap 6 of the spider wrap includes an alarm 10, a rotatable cover 1, a small cap 2 and 3, and a slidable or clickable button 6. The top cap may control the wrapping cables 21 and 22, e.g., rotating the top cap 6 in one direction may loosen the wrapping cables 21 and 22 to wrap an object, and rotating the top cap 6 in another direction may tighten the wrapping cables 21 and 22 to secure the object. The slidable/clickable button 6 or the top button 3 may be configured to lock the wrapping cables 21 and 22 in position after the object is secured. The top cap 6 may further include one or more housing sections 17 for storing the corresponding wrapping cable 21 and 22.

FIG. 4 further illustrates an exemplary internal view of the bottom cap 27 (or the base) of the spider wrap. The bottom cap 27 includes a locking cable 24 with two ends 30 and 31. The end 30 may be fixed to the corresponding port on the bottom cap 27, and the other end 31 may be plugged into or unplugged from a receiving port 23 of the bottom cap 27. Once the end 31 is plugged into the receiving port 23, the locking cable 24 is secured in place, and may only be unplugged using a key (e.g., a magnetic key touching the top cap 6 or the bottom cap 27).

Even though the locking cable 24 in FIG. 4 is configured on the bottom cap 27, a person skilled in the art would be able to revise the design and configure the locking cable 24 on the top cap 6, in which the bottom cap 27 may simply be a base.

Figure 6A:
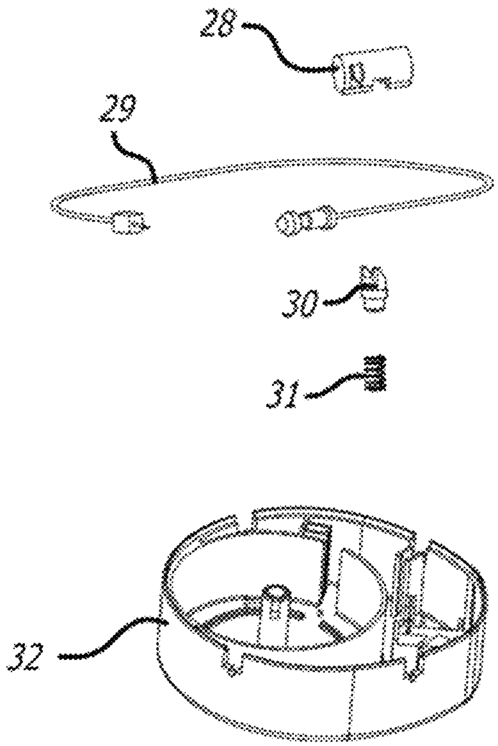
FIG. 6A illustrates an exploded view diagram of the enhanced spider lock, in accordance with some embodiments.

FIG. 6A illustrates an exploded diagram of the bottom cap of the enhanced spider lock, in accordance with some embodiments. As shown, the locking cable 29 is integrated into the spider lock through component 28, the collar post 30, a collar post spring 31, and a receiving port 28. The bottom cap has a base 32 that contains a housing for the locking cable 29. The housing may store the locking cable 29 when the locking cable 29 is retracted inside of the bottom cap.

Figure 6B:
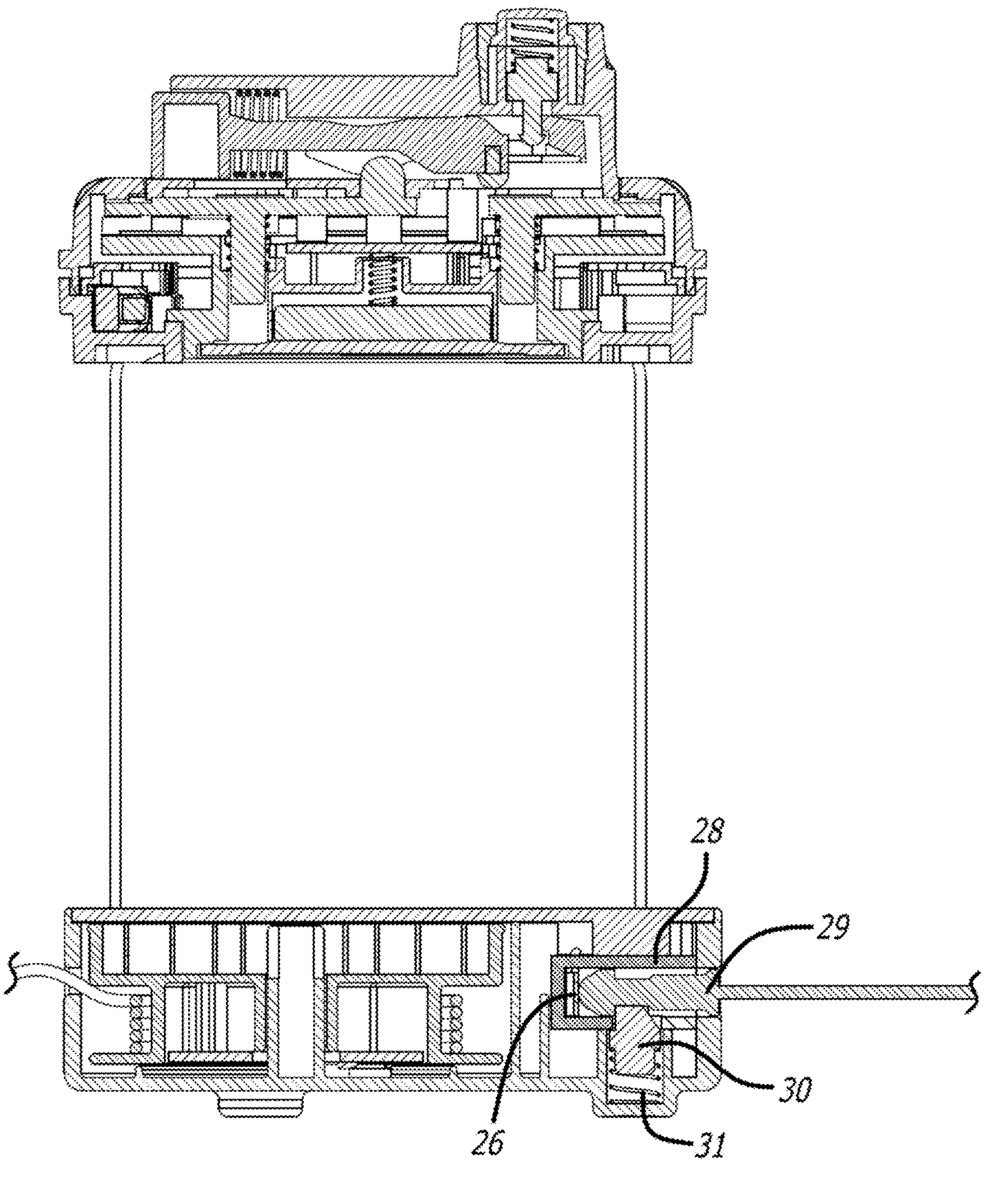
FIG. 6B illustrates an exemplary assembly diagram of the enhanced spider lock, in accordance with some embodiments.

FIG. 6B illustrates an exemplary assembly diagram of the enhanced spider lock, in accordance with some embodiments. As shown in FIG. 6B, the tip 29 of the locking cap featuring a groove is plugged into the receiving port 28. Inside the receiving port 28, there is a blocking component 30 attached to a spring 31. When the cable tip 29 is inserted, the groove of the cable tip 29 securely latches onto the blocking component 30, creating a firm connection. In some embodiments, the receiving port 28 may include a feedback component 26 to provide the click feedback to the user plugging or unplugging the cable tip 29. To release the locking cable 29 from the receiving port 28, a magnetic key or another type of key may be used to disengage the blocking component 30 from the groove of the cable tip 29.

FIG. 7 illustrates a perspective view of the enhanced spider wrap exposing another exemplary internal structure of the bottom cap, in accordance with some embodiments.

As shown, the bottom cap is designed with a retracting system with a concealed compartment. The concealed compartment includes an internal guided track 710 equipped with a spring mechanism (not shown). The guided track 710 conceals the locking cable when the locking cable is retracted and coiled inside. This spring not only facilitates smooth retraction of the cable but also provides the necessary rotating power, enhancing the efficiency of the retraction process. Users can pull the cable out of the guided track when needed to a desired length. Once the cable is plugged into the receiving port on the bottom cap, the retracting system is disabled (no more retracting power) such that the cable securely locks into its current position, ensuring stability and security. When the cable is released from the receiving port (e.g., using a key), the retracting system automatically retracts and recoils the locking cable into the concealed compartment.

In this disclosure, spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A spider wrap, comprising:

a first cap, a second cap, a wrapping cable section connecting the first cap and the second cap, wherein the wrapping cable section is configured to wrap around an item and create a secure enclosure, and a locking cable comprising a first end and a second end, wherein:

the first end of the locking cable is fixed to a first position on the second cap, the second end of the locking cable is configured to:

plug in a receiving port at a second position on the second cap to securely engage with the second cap; and unplug from the receiving port to disengage from the second cap.

2. The spider wrap of claim 1, wherein the first position and the second position are two different positions on the second cap.

3. The spider wrap of claim 1, wherein a key is required to unplug the second end of the locking cable from the receiving port at the second position on the second cap.

4. The spider wrap of claim 1, wherein the second cap comprises an alarm tag, and the alarm tag is triggered if the locking cable is cut, the second end of the locking cable is unauthorizedly unplugged, the locking cable is tampered with, or a sudden force is applied to the locking cable.

5. The spider wrap of claim 1, wherein the second end of the locking cable is configured to thread through a fixture of a shelf before plugging in the receiving port on the second cap, such that the spider wrap is securely tied to the fixture.

6. The spider wrap of claim 1, wherein the second end of the locking cable is configured to plug in a receiving port of a different spider wrap, to connect the spider wrap to the different spider wrap.

7. The spider wrap of claim 1, wherein the second end of the locking cable is locked into the receiving port on the second cap using a magnetic locking mechanism.

8. The spider wrap of claim 1, wherein the first cap is a top cap, and the second cap is a bottom cap.

9. The spider wrap of claim 1, wherein the first cap is a bottom cap, and the second cap is a top cap.

10. The spider wrap of claim 1, wherein the second cap comprises a retracting assembly, the first end of the locking cable is attached to the retracting assembly, and the retracting assembly is configured to:

keep the locking cable coiled and concealed within the second cap in a default state, wherein the second end of the locking cable remains accessible to a user to pull the locking cable out of the second cap; and uncoil and release the locking cable from the second cap when the user pulls the second end of the locking cable.

11. The spider wrap of claim 10, wherein the retracting assembly is configured to:

when the second end of the locking cable is plugged into the receiving port of the second cap, hold the locking cable at a current length and suspend retracting power of the retracting assembly.

12. The spider wrap of claim 10, wherein the retracting assembly is further configured to:

automatically retract and recoil the locking cable when the second end of the locking cable is popped out from the receiving port.

13. The spider wrap of claim 1, wherein the first position and the second position are between 45 and 180 degrees apart, inclusive of both 45 and 180 degrees.

* * * * *